Aug. 6, 1940.  C. L. CUMMINS  2,210,067
FUEL FEEDING AND DISTRIBUTING APPARATUS FOR OIL BURNING ENGINES
Filed May 13, 1938  6 Sheets-Sheet 2
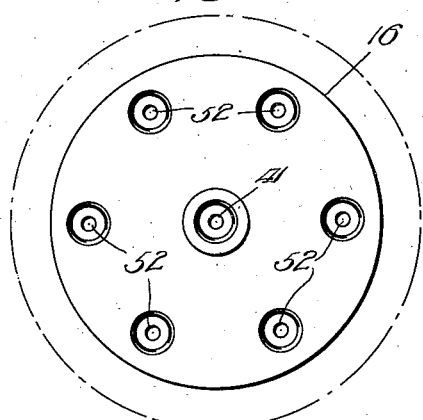
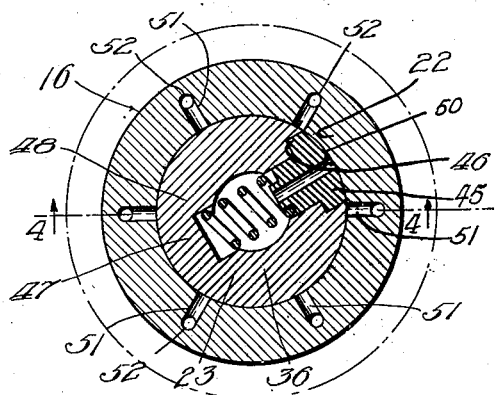
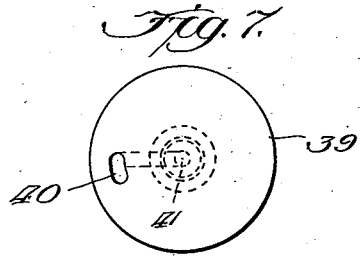
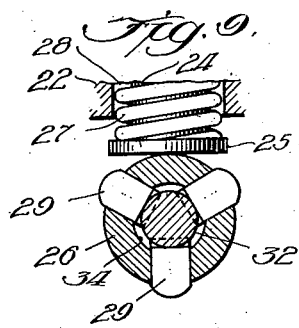
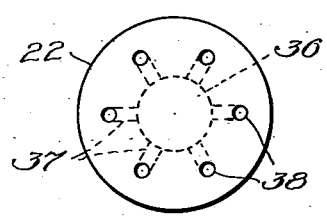
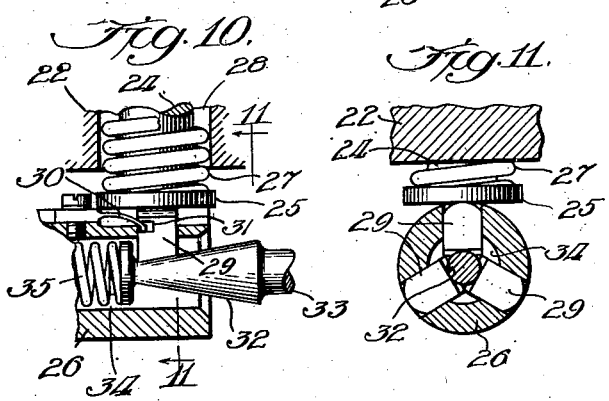
Inventor
Clessie L. Cummins
by Davis, Lindsey, Smith & Shonts
Attys.

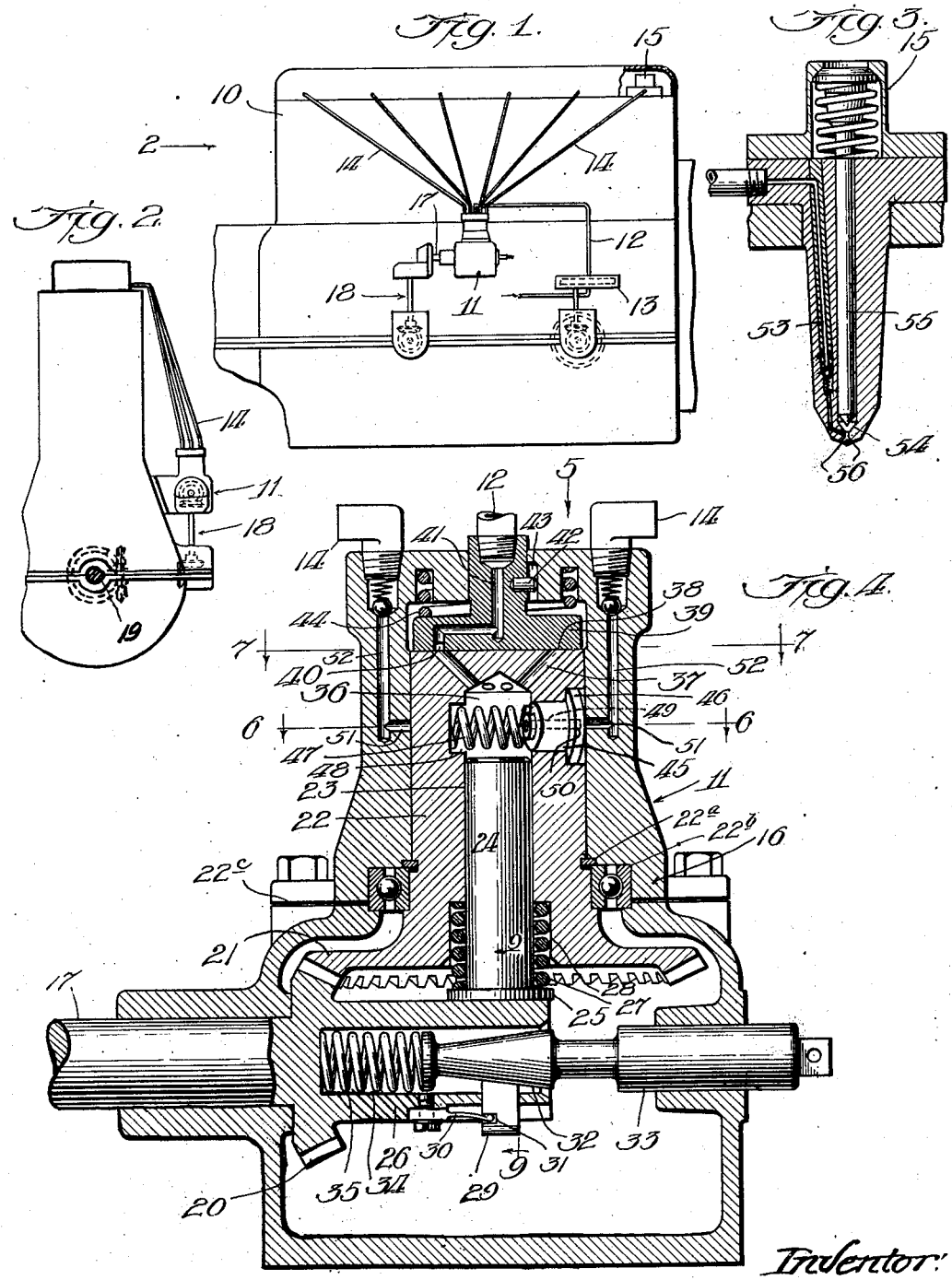

Aug. 6, 1940.  C. L. CUMMINS  2,210,067
FUEL FEEDING AND DISTRIBUTING APPARATUS FOR OIL BURNING ENGINES
Filed May 13, 1938   6 Sheets-Sheet 3
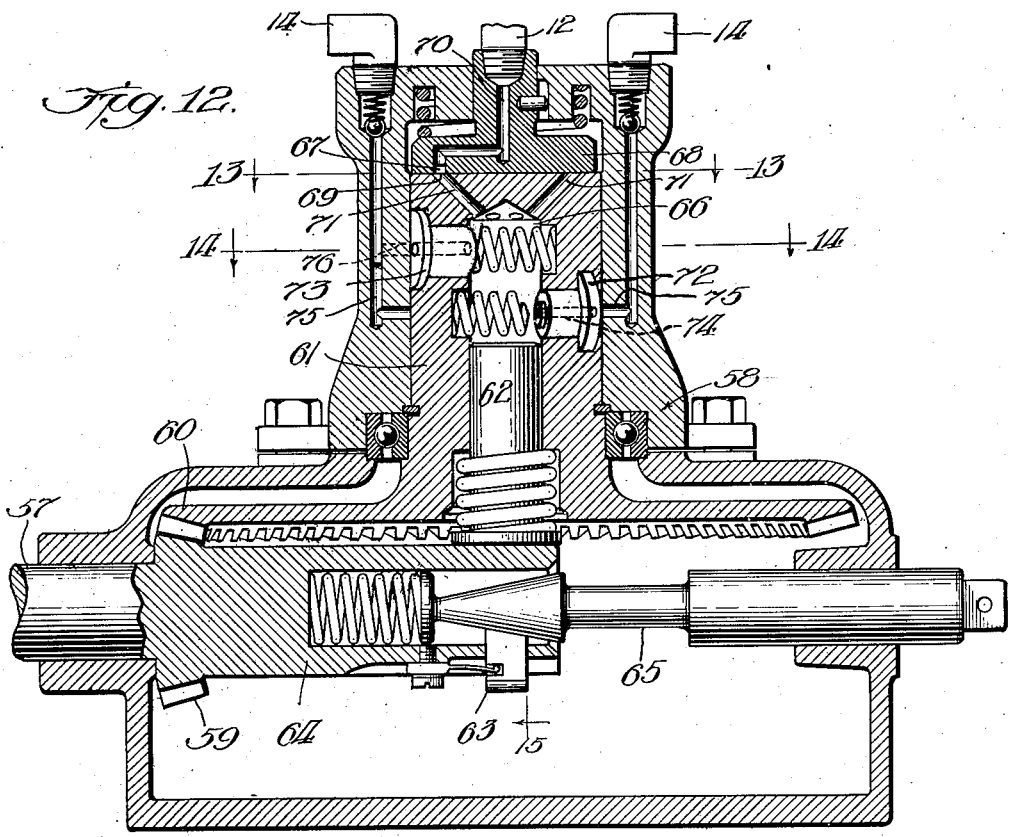
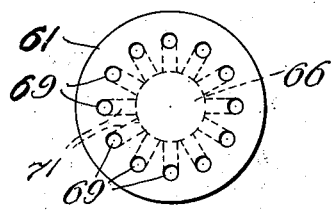
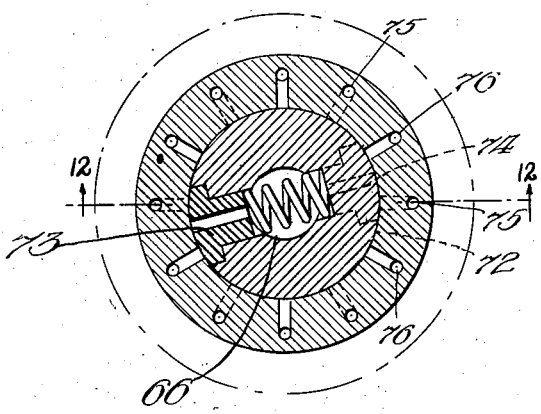
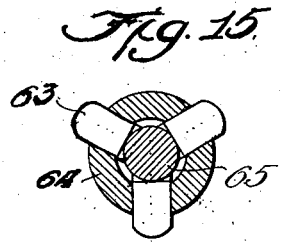
Inventor:
Clessie L. Cummins
By Davis, Lindsey, Smith & Shonts
attys

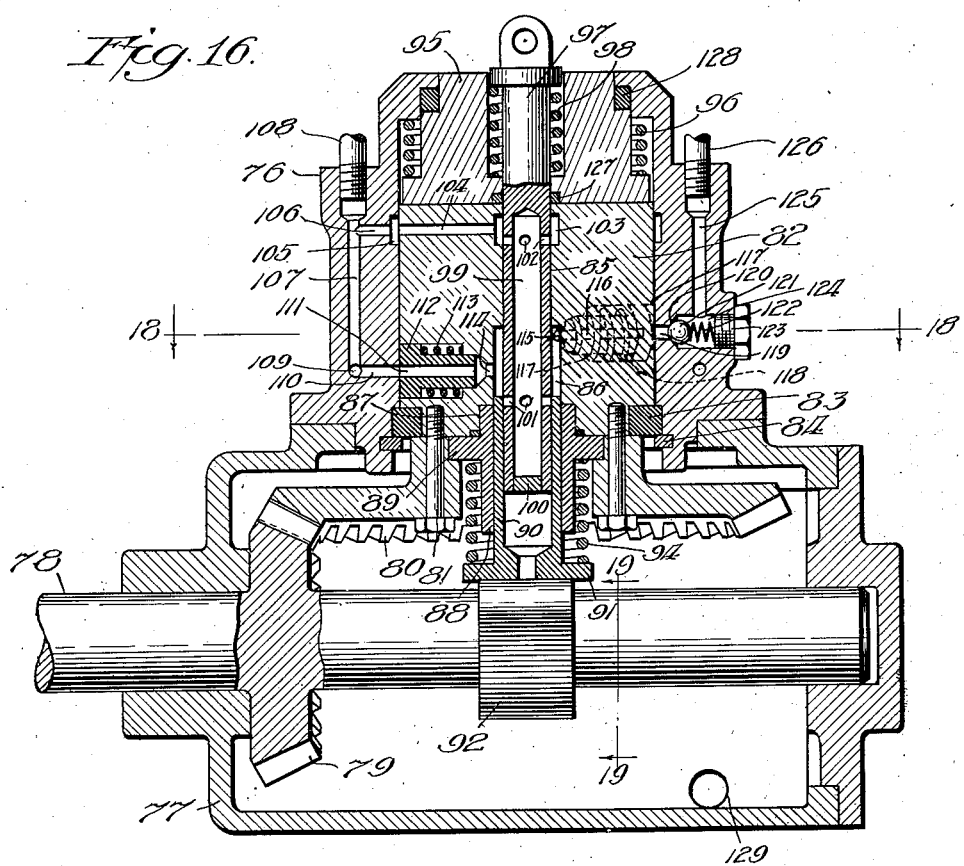

Aug. 6, 1940.   C. L. CUMMINS   2,210,067
FUEL FEEDING AND DISTRIBUTING APPARATUS FOR OIL BURNING ENGINES
Filed May 13, 1938   6 Sheets-Sheet 5
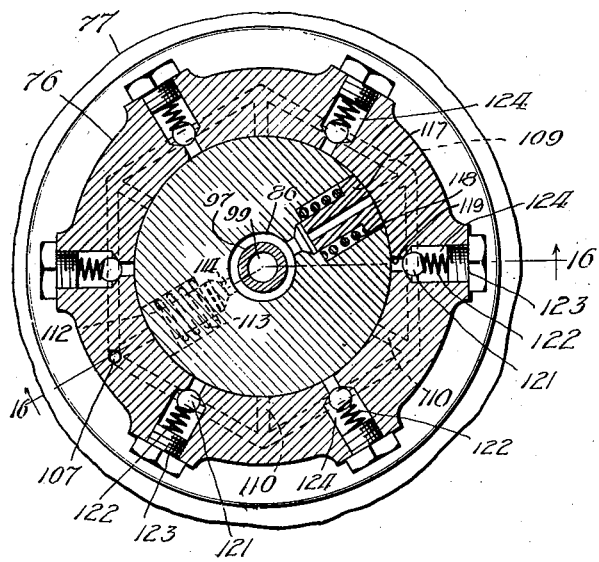
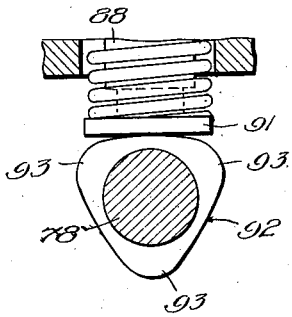
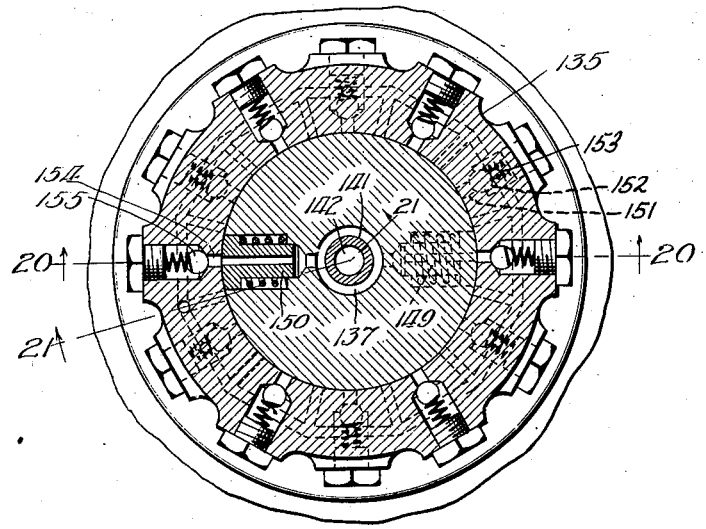
Inventor:
Clessie L. Cummins
by Davis, Lindsey, Smith & Shonts
Attys.

Aug. 6, 1940.   C. L. CUMMINS   2,210,067
FUEL FEEDING AND DISTRIBUTING APPARATUS FOR OIL BURNING ENGINES
Filed May 13, 1938   6 Sheets-Sheet 6
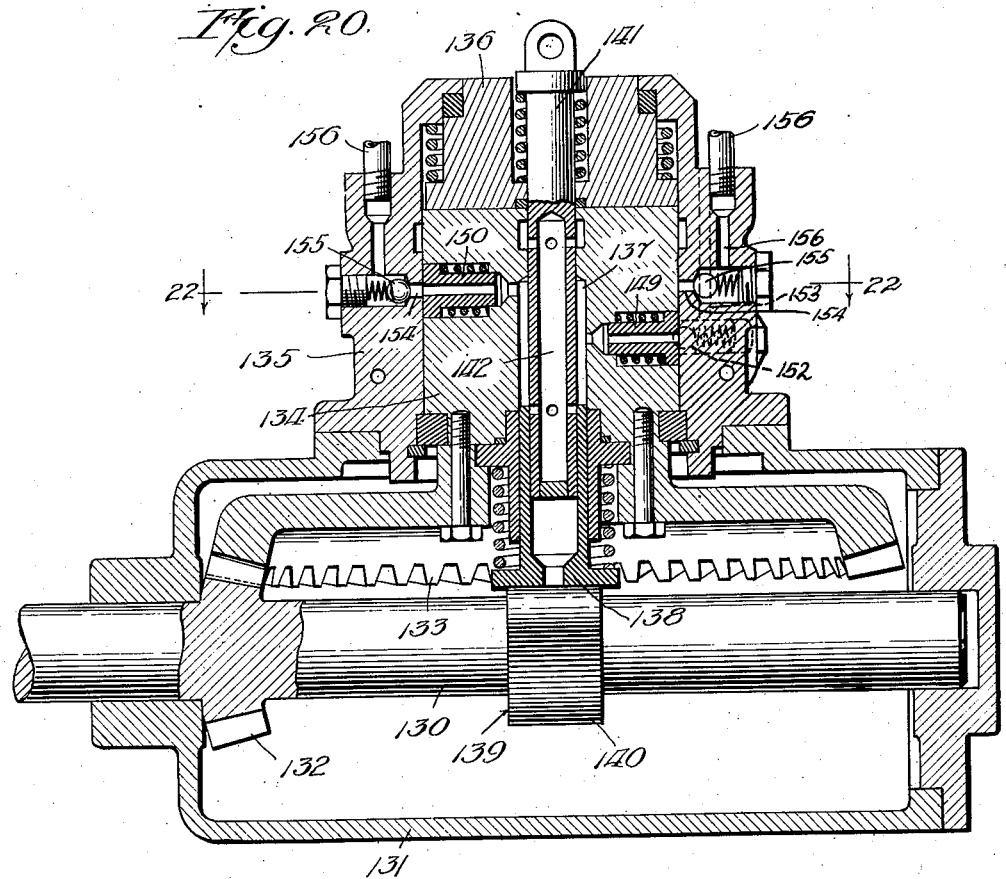
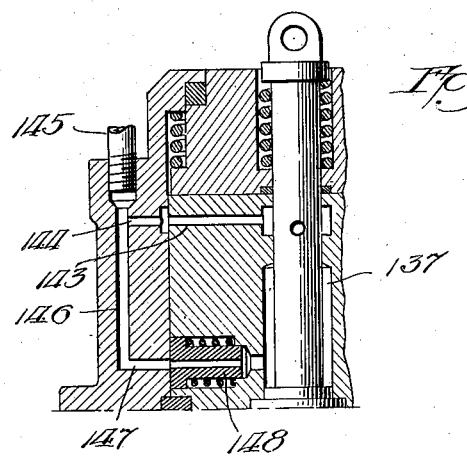
Inventor:
Clessie L. Cummins
by Davis, Lindsey, Smith & Shonts
Attys.

Patented Aug. 6, 1940

2,210,067

UNITED STATES PATENT OFFICE 2,210,067

FUEL FEEDING AND DISTRIBUTING APPARATUS FOR OIL BURNING ENGINES

Clessie L. Cummins, Columbus, Ind., assignor to Oil Engine Development Company, Columbus, Ind., a corporation of Indiana Application May 13, 1938, Serial No. 207,792

39 Claims. (Cl. 123—139)

My invention relates to fuel feeding and distributing apparatus and more particularly to devices of this character which are arranged for the handling of a liquid fuel and its positive discharge in desired, equal quantities to a plurality of engine cylinders.

The present apparatus is of the same general type as that disclosed in my United States Letters Patent No. 2,001,126, dated May 14, 1935, as regards the association of an injector for each engine cylinder for forcibly delivering measured quantities of fuel thereto, a fuel or metering pump common to all the injectors, and a charging pump for delivering the liquid fuel under pressure to the metering pump. Accordingly, the invention disclosed herein is characterized by the same operating advantages as my earlier device in respect of a positive, mechanical and so-called two-stage handling of the fuel, i. e., a feeding of measured and equal charges of the fuel at relatively low pressure to the several injectors by the fuel pump and a delivery of these charges by the injectors into the engine cylinders against the much higher compression pressures obtaining therein.

One object of the present invention is to provide a fuel feeding and distributing apparatus which is particularly desirable for use with multicylinder engines, more especially those comprising six or more cylinders, because of the facility with which the inlet and outlet service ports of the metering pump chamber may be arranged to provide efficient sealing between the ports.

A further object is to devise an apparatus of the character indicated in which the ports and passages connecting the fuel or metering pump-chamber with the charging pump and injectors, respectively, are arranged to provide a substantially uni-directional flow of the fuel through the apparatus.

A further object is to devise an apparatus which is characterized by simplicity in respect of its distributor construction, the driving mechanism therefor, and the variable control of the stroke of the metering pump piston.

A further object is to devise an apparatus in which simplification of the fuel metering is effected by cooperatively relating a constant stroke metering piston with a valve that may be shifted in response to changes in speed and load.

A further object is to provide for oil engines a fuel distributing apparatus whose distributing element is at all times subjected to pressure of the oil supplied thereto, thereby insuring continuous and adequate lubrication of the element, including periods of operation under closed throttle and a constant filling of all ports and passages in the apparatus with oil.

This application is a continuation-in-part of my copending application for a Fuel feeding and distributing apparatus for oil burning engines, Serial No. 117,283, filed December 23, 1936.

These and further objects of my invention will be set forth in the following specification, reference being had to the accompanying drawings, and the novel means by which said objects are effectuated will be definitely pointed out in the claims.

In the drawings:

Figure 1 is a diagrammatic, side elevation of a six cylinder engine of the oil burning type showing the relation of my improved apparatus thereto.

Fig. 2 is an end view of the engine shown in Fig. 1, looking in the direction of the arrow 2 in said figure.

Fig. 3 is a diagrammatic, sectional elevation of an injector for delivering the fuel charges into each cylinder.

Fig. 4 is an enlarged, sectional elevation of the apparatus as viewed in Fig. 1, and as taken along the line 4—4 in Fig. 6 looking in the direction of the arrows.

Fig. 5 is a plan view of the apparatus, looking in the direction of the arrow 5 in Fig. 4, and showing the relation of the injector lines and the fuel supply line from the charging pump.

Fig. 6 is a sectional view along the line 6—6 in Fig. 4, looking in the direction of the arrows, and showing the relation of the discharge port of the metering pump to the several ports communicating with the injector lines.

Figs. 7 and 8 are plan views of the contacting faces of the stationary and rotating distributing members of the apparatus, respectively, as viewed along the line 7—7 in Fig. 4.

Fig. 9 is a sectional view taken along the line 9—9 in Fig. 4, looking in the direction of the arrows, and showing the metering pump piston and the operating cam toggles.

Fig. 10 is a partial sectional view of the metering pump piston and the cam toggles, as viewed in Fig. 4, the toggles being retracted to a zero lift position.

Fig. 11 is a section along the line 11—11 in Fig. 10, looking in the direction of the arrows.

Fig. 12 is an enlarged sectional view of a modified form of the apparatus, similar to that illustrated in Fig. 4, but intended for use with a twelve cylinder engine, and as taken along the line 12—12 in Fig. 14 looking in the direction of the arrows.

Fig. 13 is a plan view of the upper end face of the rotating distributing member of the apparatus, as viewed along the line 13—13 in Fig. 12, looking in the direction of the arrows.

Fig. 14 is a section along the line 14—14 in Fig. 12, looking in the direction of the arrows, and showing the relation of the discharge port of the metering pump to the several ports communicating with the injector lines.

Fig. 15 is a sectional view along the line 15 in Fig. 12, looking in the direction of the arrows, and showing the number and arrangement of the cam toggles which actuate the metering pump piston.

Fig. 16 is a sectional elevation taken along the line 16—16 in Fig. 18, looking in the direction of the arrows, and showing a modification of the apparatus illustrated in Fig. 4 in that a constant stroke piston is employed to deliver the fuel charges to the several injector lines and metering of the charges is effected by a slide valve, the view being taken along the line 16—16 in Fig. 18 looking in the direction of the arrows.

Fig. 17 is a diagrammatic, sectional view showing the relation of the valve and pump piston when the engine is operating with a fully open, fully closed, or partially closed throttle.

Fig. 18 is a section along the line 18—18 in Fig. 16, looking in the direction of the arrows, and showing the alternating relation of the passages which deliver fuel to the pump chamber and the passages through which the fuel charge is supplied to the several injector lines.

Fig. 19 is a section along the line 19—19 in Fig. 16, looking in the direction of the arrows, and showing the three lobe cam which reciprocates the fuel pump piston.

Fig. 20 is a sectional view of a modified form of the apparatus, similar to that illustrated in Fig. 16, but intended for use with a twelve cylinder engine, the view being taken along the line 20—20 in Fig. 22, looking in the direction of the arrows.

Fig. 21 is a partial, sectional elevation of the apparatus shown in Fig. 20, as viewed along the line 21—21 in Fig. 22, looking in the direction of the arrows, the registration of ports in this figure occurring at a different time in the operation of the apparatus from that shown in Fig. 20.

Fig. 22 is a sectional, plan view, taken along the line 22—22 in Fig. 20, looking in the direction of the arrows.

Referring to the drawings and more particularly to Figs. 1 to 4, inclusive, the numeral 10 designates a six cylinder, four cycle engine of the Cummins-Diesel type, to which, for example, I have shown my improved apparatus applied. This apparatus is designated by the numeral 11 and it receives the fuel oil through a pipe line 12 under a pressure established by a charging pump 13 to which the oil is delivered from a suitable source (not shown), the pump 13 being appropriately driven from the crank shaft of the engine. In this instance, the pump 13 is designated as being of the gear type, although other forms may be employed as desired. The fuel oil which is delivered to the apparatus 11 is metered therein and the fuel charges distributed through a plurality of injector lines 14 to a plurality of injectors 15 each of which is mounted in an associated cylinder and which delivers the charges into the cylinders.

Referring to Fig. 4 which illustrates the structural details of my improved apparatus, the numeral 16 designates an enclosing casing having journaled in the lower portion thereof one end of a driving shaft 17 which is suitably driven through a system of gearing, designated generally by the numeral 18 in Figs. 1 and 2, by the crank shaft 19 of the engine and arranged so that the shaft 17 rotates at crank shaft speed.

Within the casing 16 a bevel pinion 20 is provided on the shaft 17 and it meshes with a bevel gear 21 formed on the lower end of a rotary cylinder 22 that fits within the upper end of the casing. The cylinder 22 may be maintained in the position shown by a retaining ring 22ª that is appropriately seated around the inner wall of the cylinder and engaged by a thrust and radial load bearing 22ᵇ which additionally seats against appropriate shoulders formed in the housing and cylinder. To facilitate the positioning of the bearing, the housing may be split as indicated by the numeral 22ᶜ. The cylinder 22 is provided with a bore 23 that is coaxial with the cylinder and reciprocably mounted within this bore is a metering piston 24. The lower end of the piston extends below the gear 21 and is provided with a flange 25 that rides on the peripheral surface of a hub 26 formed as an extension on the shaft 17. Contact of the flange 25 with the hub 26 is maintained by a coil spring 27 which encircles the piston 24, one end of the spring bearing against the flange and the opposite end against a shoulder formed in the cylinder 22 by a counterbore 28 within which the coil spring is received.

In order to reciprocate the piston 24 in timed relation to the engine, a plurality of cam toggles 29 are slidably mounted in the hub 26 transversely to the axis of the shaft 17 and these toggles are equi-spaced around the hub. In the design illustrated, three toggles are provided, thus insuring six reciprocations of the metering piston 24 during two revolutions of the driving shaft 17 and the same number of revolutions of the engine crank shaft. During the same period and owing to the two to one speed ratio between the pinion 20 and gear 21, the rotary cylinder 22 makes one complete revolution. Each of the cam toggles is prevented from flying outwardly under the impulse of centrifugal force by a spring finger 30 which is mounted on the hub, the free end of the finger engaging the walls of a slot 31 provided in the associated toggle. (See Figs. 4 and 9.) Under the impulse of the fingers 30, the inner ends of the toggles 29 are maintained in contact with a tapered cam portion 32 of an operating rod 33 which is slidably mounted in the casing 16 and which projects externally of the casing for securement to a hand throttle or governor control mechanism (not shown). The cam portion 32 is received within a bore 34 provided in the hub and the inner end of the rod 33 contacts a coil spring 35 whose opposite end seats against the inner end of the bore 34. From the foregoing description, it will be obvious that the stroke of the metering piston 24 may be varied as desired by suitably positioning the operating rod 33 and hence the positions of the cam toggles 29.

Above the piston 24, the bore 23 constitutes a metering chamber 36 from which extends a plurality of equi-spaced passages 37 whose upper ends terminate at the end face of the rotary cylinder 22 to form inlet ports 38. Preferably, the passages 37 are inclined generally as indicated in Fig. 4 so as to provide for the maximum spacing of the ports 38 and hence efficient interport seals. In the construction shown, six ports 38 are provided in the end face of the cylinder. Abutting against the end face of the cylinder 22 is the under surface of a disk 39 which is provided with a port 40 in the contacting face thereof and which is adapted to register successively with the inlet ports 38 as the cylinder 22 rotates. The port 40 marks the inner end of a passage 41 whose outer end is connected to the pipe line 12 leading from the charging pump 13. The disk 39 is held against rotation through the medium of a pin 42 which is fixed in a hub portion provided on the disk 39 and which is seated in a channel 43 provided in the upper portion of the casing 16. This channel is sufficiently long to permit of a slight endwise movement of the disk 39 so that a coil spring 44 may hold the disk 39 firmly seated against the end face of the cylinder 22, one end of the spring abutting against the top surface of the disk and the opposite end against the top wall of the casing 16.

A bushing 45 is seated in the annular wall of the cylinder 22 and in such a location that its axis is substantially above the upper end of the piston 24 when occupying its limiting upper position as determined by the maximum throw of the cam toggles. This bushing extends completely through the cylinder wall and is flanged as at 46, the outer surface of the flange being curved to closely fit the cylindrical wall of the casing 16. One end of a coil spring 47 abuts against the inner end of the bushing and the opposite end of the spring is seated in a recess 48 provided oppositely in the bore 23, the spring acting to always maintain the curved surface of the flange 46 in sealing relation to the inner wall of the casing 16. The bushing 45 is also provided with an axially located discharge passage 49 whose inner end communicates with the metering chamber 36 and whose outer end defines a discharge port 50 which during the rotation of the cylinder 22 registers successively with ports 51 making the inner ends of passages 52 which are circumferentially arranged around the wall of the casing 16 and each of which communicates with an injector line 14.

Referring to Fig. 3, the fuel charge which is delivered to each injector line 14 eventually passes to a duct 53 provided in each injector, from which the charge flows downwardly into the lower extremity of a chamber 54 which is formed when the injecting plunger 55 is in the raised position shown in the figure. This charge of fuel is forced into the chamber 54 when the pressure in the chamber and the combustion space of the engine cylinder is relatively low, as during the suction stroke of the engine piston. The plunger 55 is actuated downwardly by suitable means (not shown) at the proper time to force the fuel through the small openings 56 into the combustion space of the cylinder, as more fully described in my U. S. Letters Patent No. 1,561,913.

In the operation of my improved apparatus as above described, a predetermined pressure is maintained in the supply line 12 by the charging pump 13, this pressure being preferably in excess of twenty pounds. Accordingly, during each registration of the port 40 with one of the inlet ports 38, an amount of fuel is delivered into the metering chamber 36 sufficient to completely fill this chamber and the various parts of the apparatus are so timed that the indicated registration of the ports in question occurs when the piston 24 is occupying its lowermost position as determined by contact of the flange 25 with the hub 26. After the metering chamber 36 has thus been charged, the rotary cylinder 22, which is rotating at a constant speed, i. e., one-half of the crank shaft speed for the construction shown, is rotated to a position in which the port 40 is masked by a portion of the upper end face of the cylinder 22 between a pair of the adjacent ports 38 and, during this masking, the discharge port 50 registers with one of the ports 51 substantially coincident with an upward thrust of the piston 24 by one of the cam toggles 29.

By maintaining a predetermined pressure on the supply line 12, it is possible to insure that the metering chamber 36 is always fully supplied with fuel throughout the speed range of the engine. Variations in the length of the metering piston stroke and accordingly variations in the amount of measured fuel charges delivered to the injector lines can be readily adjusted to the load conditions by suitably controlling the position of the operating rod 33. In the position of the parts illustrated in Fig. 4, the cam toggles 29 occupy positions in which the piston delivers a fuel charge corresponding to a partially opened throttle. By moving the operating rod 33 toward the left, as viewed in Fig. 4, the thrust of the piston 24 and accordingly the volume of the measured charge is increased and when this rod is moved to the position illustrated in Fig. 10, the pressure of the spring 27 moves each of the toggles inwardly until their outer ends are substantially flush with the peripheral surface of the hub 26. In this position, which corresponds to a fully closed throttle, the piston 24 does not deliver any fuel charge to the injector lines, and this condition may obtain when a motor vehicle equipped with an engine provided with my improved apparatus is coasting under closed throttle against the compression of the engine cylinders.

While the engine is running under at least partially opened throttle, the metering chamber 36 is charged through the ports 38 and the piston 24 then delivers measured and equal fuel charges through the port 50 to each of the injector lines, as determined by the position of the operating rod 33. The metering piston 24 operates simply against the liquid head present in each of the injector lines and hence at a relatively low pressure. The charges thus measured by the metering pump eventually reach the mixing chamber 54 in each of the injectors 15, from which they are delivered into the respective engine cylinders through the passages 56 by a downward movement of the associated plunger 55, as more particularly described in my earlier patent.

In Figs. 12 to 15, inclusive, there is illustrated a modification of my improved apparatus which is intended for use with a twelve cylinder, four cycle, oil burning engine of the type indicated above. The general features of construction of this modification are substantially identical with the apparatus heretofore described, but modified to accommodate the apparatus to twelve cylinder operation.

Referring to Fig. 12, the numeral 57 designates a driving shaft which performs the same function as the shaft 17, but which, for reasons presently noted, is intended for connection to the engine crank shaft by gearing similar to that illustrated in Figs. 1 and 2 so that it operates at twice the rotative speed of the crank shaft. The shaft 57 is journaled in the apparatus casing 58 and is provided with a bevel pinion 59 which meshes with a bevel gear 60 forming part of a rotary cylinder 61 that fits snugly in the apparatus casing. The speed ratio between the pinion 59 and gear 60 is four to one so that for two revolutions of the engine crank shaft, corresponding to a firing of all twelve cylinders, the rotary cylinder 61 makes one complete revolution.

The cylinder 61 is also provided with a metering piston 62 whose reciprocation is effected by a plurality of toggles 63, three in number which are slidably mounted in and equi-spaced around a hub 64 forming part of the shaft 57. The radial position of these toggles is determined by an operating rod 65 and the fuel charges are periodically forced into the metering chamber 66 whenever the port 67 in the disk 68 registers with one of the ports 69 in the end face of the cylinder 61. It will be understood that, as in the apparatus first described, the port 67 communicates through a passage 70 with the pipe line 12 leading from the charging pump 13 and that each port 69 communicates through a passage 71 with the metering chamber 66.

The essential distinction between this modification and the form described above consists in the manner in which the fuel charges in the metering chamber 66 are delivered to the respective cylinders. In order to provide for an efficient handling of the fuel and a satisfactory inter-port seal within the apparatus, the engine cylinders are preferably arranged in groups of six for purpose of distribution, one group being serviced through a bushing 72 arranged as before in the annular wall of the pump cylinder 61, while the other group is serviced through a similar bushing 73, also arranged in the annular wall of the cylinder, but in opposite relation to the bushing 72 and offset therefrom along the axis of the pump cylinder, as substantially indicated in Fig. 12. The bushings 72 and 73 are mounted in the pump cylinder in the same manner as indicated for the bushing 45. Fuel charges that are forced through the passage 74 in the bushing 72 are delivered to passages 75 in the apparatus casing, while fuel charges that are delivered to the bushing 73 are discharged into fuel passages 76, the passages 75 and 76 alternating around the apparatus casing, as generally indicated in Fig. 14, and being connected to injector lines 14.

In the operation of this modification, the metering chamber 66 is filled periodically with fuel under pressure, as in the apparatus first described, and these charges are discharged by the successive thrusts of the metering piston 62 alternately into the injector passages 75 and 76, so that during one complete revolution of the rotary cylinder 61, all twelve cylinders of the engine receive measured and equal charges of fuel, as determined by the position of the operating rod 65.

In Figs. 16 to 19, inclusive, there is illustrated a modification of the apparatus shown in Fig. 4. Geneally speaking, this modification is characterized by a reduction in the number of working parts and by the use of a constant stroke piston in the fuel pump, metering of the fuel charges being accomplished by positioning a slide valve relative to the piston.

Referring to Fig. 16, the numeral 76 designates a casing having secured to the lower end thereof a second casing 77. A driving shaft 78 is journaled in the casing 77 and may be driven by a system of gearing, similar to that indicated by the numeral 18 in Fig. 2, by the crank shaft 19 of the engine and arranged so that the shaft 78 rotates at crank shaft speed. Within the casing 77, a bevel pinion 79 on the shaft meshes with a bevel gear 80 that is secured by cap screws 81 to the lower end of a rotary cylinder 82 which fits within the casing 76. The cylinder 82 is rotatably supported on a journal ring 83 that is recessed in the wall of the casing 76 and this ring in turn is supported by a retaining ring 84 that is similarly recessed in the same casing.

The cylinder 82 is provided with a bore 85 that extends axially therethrough and, at a predetermined distance below the top of the cylinder, this bore is counterbored to provide a pump chamber 86. Adjacent the lower end of the pump chamber, the latter is counterbored as at 87 to receive the upper end of a guide bushing 88 that extends for some distance below the lower end of the cylinder 82. The bushing 88 is provided with an annular flange 89 that abuts against the bottom of the cylinder 82 and acts as a base for one end of a coil spring as hereinafter described. The diameter of the passage through the bushing 88 is the same as the diameter of the pump chamber 86 and a sleeve piston 90 is mounted to reciprocate in the bushing and chamber. The lower end of the piston is provided with a flange 91 that rides on the periphery of a cam 92 mounted on the shaft 78 and having three lobes 93 (see Fig. 19) which are equi-spaced around the shaft. The flange 91 is maintained in contact with the cam 92 by means of a helical spring 94 that encircles the bushing 88 between the flanges 89 and 91. Due to the fact that the pinion 79 rotates at crank shaft speed and that the pitch diameter of the gear 80 is twice that of the pinion 79, the cylinder 82 will make one complete revolution during two revolutions of the engine crank shaft and, during the same period, the piston 90 will be reciprocated six times by the lobes on the cam 92.

A collar 95 seats against the upper end of the cylinder 82 and is urged into contact therewith by means of a helical spring 96 that abuts against a shoulder provided on a continuation of the casing 76. The degree of pressure between the coacting faces of the collar 95 and the cylinder 82 is relatively light and need only be such as to provide for a sealing contact.

A metering slide valve 97 is mounted in the bore 85 and is normally urged in an upward direction, as viewed in Fig. 16, by means of a helical spring 98 that encircles the valve, one end of the spring bearing against a shoulder provided on the collar 95 and the opposite end against a shoulder provided on the valve. The valve extends beyond the upper end of the casing 76 for securement to a hand throttle or governor control mechanism (not shown) and downwardly through the pump chamber 86 to form the inner wall thereof and has a sliding fit within the sleeve piston 90. The valve is also drilled upwardly from the lower end for a predetermined distance to provide an interior passage 99 and the lower end of this passage is closed by a plug 100.

A plurality of ports 101 are provided in the wall of the valve and all of these ports lie in the same plane transverse to the axis of the valve a predetermined distance above the plug 100 and serve as by-pass or bleeding ports to divert all or a portion of the fuel charge in the pump chamber during the delivery stroke of the piston 90, dependent on the initial position of the ports as hereinafter described. Adjacent the upper end of the passage 99, a similar set of ports 102 is provided in the wall of the valve 97 and these ports provide constant communication between the passage 99 and an annular channel 103 provided in the rotary cylinder 82. The channel 103 is connected by a radial passage 104 with an annular channel 105 provided in the journal face of the casing 76 and the last-named channel is connected by a passage 106 with a vertical passage 107 that communicates through a pipe 108 with the charging pump 13, the pipe 108 therefore corresponding to the pipe 12 in Fig. 1. The lower end of the passage 107 is connected to an annular passage 109 which extends around the wall of the casing 76 in a plane generally normal to the axis of the piston 90 and which may have the hexagonal shape as generally indicated in Fig. 18. A plurality of equi-spaced, radial passages 110 extend from the passage 109 to the journal face of the casing 76 and the inner ends of the passages 110 are intended to register in succession as the cylinder 82 rotates with the outer end of a radial passage 111 provided in a bushing 112 that is mounted in the cylinder 82 and pressed outwardly into contact with the face of the casing 76 by an encircling, helical spring 113. The inner end of the passage 111 communicates with the pump chamber 86 through a port or short passage 114.

From the foregoing, it will be understood that the passages 107 and 104, the annular channel 103 and the passage 99 are continuously filled with fuel oil under pressure by the charging pump 13. The height of the channel 103 is such that, notwithstanding any vertical adjustment of the valve 97, the port 102 will always register with this channel. Further, as the cylinder 82 rotates, the successive registrations of the passages 110 and 111 will result in six fillings of the pump chamber 86 with fuel during one rotation of the cylinder corresponding to two revolutions of the engine crank shaft.

In order to successively deliver the fuel charges in the pump chamber to the several injector lines, a short passage 115 connects the upper end of the chamber with a radial passage 116 provided in a bushing 117 that is also mounted in the cylinder 82 and has its outer face urged into contact with the inner wall of the casing 76 by an encircling, helical spring 118. Periodically, during the rotation of the cylinder 82, the outer end of the passage 116 registers with the inner end of one of a plurality of radial passages 119 provided in the casing 76 and which are also equi-spaced around the casing, but in alternating relation to the supply passages 110, as clearly indicated in Fig. 18. Each passage 119 merges into a valve seat 120 which is normally closed by a ball check 121 under the impulse of one end of a spring 122 whose outer end abuts against a plug 123 mounted in the casing. The strength of the spring 122 is such as to permit unseating of the ball check 121 by the pressure established during the delivery stroke of the piston 90, but the seating pressure of the ball check is greater than the charging pressure of the fuel in the pipe line 108, thus avoiding any possibility of the charging pressure unseating the ball check 121 during the supply of fuel to the pump chamber, assuming that the valve 97 is raised to a position in which the ports 101 are not masked by the sleeve piston 90. Oil that is forced through the ball check 121 is delivered into a chamber 124, from which it passes through a vertical passage 125 to an injector line 126.

In the operation of the apparatus as illustrated in Figs. 16 to 19, inclusive, a predetermined pressure is maintained in the supply line 108 by the charging pump 13, as already discussed in connection with the apparatus shown in Fig. 4, and this pressure should in all cases be less than the seating pressure of the ball check valve 121, but preferably in excess of twenty pounds. Accordingly, during each registration of the passage 111 with one of the passages 110, an amount of fuel is delivered into the pump chamber 86 sufficient to completely fill this chamber and, as in the case of the apparatus shown in Fig. 4, the various elements of this modification are so timed that the indicated registration occurs when the piston 90 is occupying its lowermost position, as illustrated in Fig. 16.

It will also be assumed that the slide valve 97 is occupying the position also shown in Fig. 16, namely, one in which the ports 101 are completely masked by the piston 90 at the beginning of its delivery stroke, thus preventing delivery of any oil from the chamber 86 into the passage 99 during the upstroke of the piston 90.

After the pump chamber has thus been charged, the cylinder 82, which is rotating at one-half crank shaft speed, moves to a position in which the inlet end of the passage 111 is masked by the inner surface of the casing 76 and, during this masking, the passage 116 registers with a passage 119 substantially coincident with an upward thrust of the piston 90 by one of the cam lobes 93. The pressure thus created in the pump chamber 86 is sufficient to unseat the ball check valve 121 against the pressure of the spring 122, thus permitting flow of the oil to the associated injector line 126.

So long as the valve 97 occupies the position shown in Fig. 16, the piston 90 delivers equal and measured charges to the several injector lines in response to the demands of a fully opened throttle. Variation in the amount of the fuel charges is accomplished by moving the slide valve 97 and three such relative positions of the valve and piston are diagrammatically illustrated in Fig. 17.

Referring to the last-noted figure, the left-hand view shows a relation of the indicated parts corresponding to that shown in Fig. 16, i. e., a fully opened engine throttle, whereas the intermediate view shows relative positions for a fully closed throttle and the right-hand view illustrates conditions of partially opened throttle. The distance between the line A and B is intended to represent diagrammatically the full stroke of the piston 90. In the event of any failure of parts between the valve 97 and the governor, the spring 98 may shift the valve to the closing position shown in the intermediate view in Fig. 17.

Since the conditions of operation as represented by the left-hand view in Fig. 17 have already been discussed in connection with Fig. 16, it will only be necessary to describe the operative conditions represented by the intermediate and right-hand view. In the former case, it will be observed that the slide valve 97 has been moved to a position in which the ports 101 are not masked completely until the piston 90 reaches the end of its delivery stroke. Accordingly, during this stroke, oil in the pump chamber 86 will be by-passed through the ports 101 into the passage 99 against the pressure of the charging pump which constantly obtains in this passage and which, as already noted, is less than the seating pressure of the ball check valve 121. Therefore, with the valve 97 in the position indicated, no fuel charges will be delivered to the injector lines, and this position thus corresponds to a fully closed position of the engine throttle.

In the right-hand view in Fig. 17, the slide valve 97 occupies a position in which the ports 101 are in an intermediate position between the limiting position illustrated in the left-hand and intermediate views of the same figure. Therefore, as the piston 90 moves upward on its delivery stroke, some of the oil in the pump chamber 86 will be by-passed through the ports 101 until these ports have been completely masked by the moving piston. Thereafter, the amount of oil remaining in the pump chamber above the ports 101 will be discharged into the several injector lines. This position of the valve 97 corresponds to a partially opened position of the engine throttle. Variations in the amount of fuel discharged can of course be effected by suitably positioning the valve 97 and, in all cases, when the ports 101 are occupying some intermediate position between the possible limiting positions of these ports, the amount of fuel discharged through the injector lines will be a function of the distance traversed by the piston after completely masking these ports.

In addition to the simple control on the amount of the fuel charges which characterizes the construction shown in Fig. 16, the latter is also featured by a capacity to thoroughly lubricate the rotating cylinder 82 even during long periods of operation under closed engine throttle, as when the vehicle is coasting. Fuel oil under pressure is always present in the annual channel 105 and also in the delivery ends of the radial passages 110, regardless of the position of the engine throttle. Accordingly, there will be sufficient seepage along the coacting faces of the cylinder and casing 76 to provide the required lubrication and a constant filling of the passages 119, and an adequate amount of this fuel will also creep between the coacting faces of the cylinder 82 and the collar 95. Loss of this creeping oil upwardly through the apparatus is prevented by a packing ring 127 that encircles the slide valve 97 just above the cylinder 82 and also by a packing ring 128 that is interposed between the collar 95 and the upper end of the casing 76. Downward seepage of this oil presents no problem because it may be collected in the casing 77 and returned through a drain pipe 129 to the gear pump 13, or the main fuel tank. A similar drain pipe may be used in connection with the types of aparatus illustrated in Figs. 4 and 12.

In Figs. 20 to 22, inclusive, there is illustrated a modification of the apparatus shown in Fig. 16 for use with a twelve-cylinder, four cycle, oil burning engine, preferably, of the Cummins-Diesel type. The general features of construction of this modification are substantially identical with that shown in Fig. 16, but modified to accommodate the apparatus to twelve-cylinder operation.

Referring to Fig. 20, the numeral 130 designates a driving shaft which performs the same function as the shaft 78, but which is connected by suitable gearing (not shown) to the engine crank shaft so that it operates at twice the rotative speed of the crank shaft. The shaft 130 is journaled in the casing 131 and is provided with a bevel pinion 132 that meshes with a bevel gear 133 fastened to the lower end of a rotary cylinder 134. The speed ratio between the pinion 132 and gear 133 is 4 to 1 so that for two revolutions of the engine crank shaft, corresponding to four revolutions of the shaft 130 and the firing of all twelve cylinders of the engine, the rotary cylinder 134 makes one complete revolution.

The upper end of the cylinder 134 also seats against a spring loaded collar 136, generally similar to the collar 95 in Fig. 16, and reciprocably mounted in a bore in the rotary cylinder 134 constituting a pump chamber 137 is a sleeve piston 138 whose lower end rides on the surface of a cam 139 having three cam lobes 140, as generally indicated in Fig. 19.

A metering slide valve 141 is reciprocably mounted in the cylinder 134 and has its lower end slidable in the sleeve piston 138. A passage 142 is formed in the slide valve 141 and may communicate through passages 143 and 144 with a fuel supply line 145 which is connected to the charging pump 13. A vertical passage 146 is also connected to the charging line 145 and through a plurality of equi-spaced radial passages 147 with a passage formed in a bushing 148 which registers successively with the passages 147 for the purpose of supplying oil to the chamber 137.

In other words, except for the change in the rotative speed of the shaft 130 and the speed ratio between the pinion 132 and gear 133, the construction of the apparatus shown in Fig. 20, so far as described, is identical with that indicated in Fig. 16. The essential distinction between this modification and the form above described consists in the manner in which the fuel charges in the pump chamber 137 are delivered to the respective cylinders.

The systematic relation of the several ports and passages for delivering the fuel charges from the pump chamber to the several injector lines is generally similar to that illustrated for the twelve-cylinder apparatus shown in Fig. 12, i. e., the engine cylinders are preferably arranged in groups of six for purpose of distribution, one group being serviced through a bushing 149 and the other group through a similar bushing 150, the bushings of each group being similar in shape, construction detail and positioning to the bushing 117 shown in Fig. 16. The bushings 149 and 150 may be placed in the diametral relation shown in Fig. 20 but displaced axially of the cylinder 134. The passage in the bushing 149 is intended to register in succession with radial passages 151, so that when the ball check 152 is displaced from its seat during the delivery stroke of the piston 138, the fuel charge will pass to one of the injector lines 153. Similarly, the passage in the bushing 150 registers in succession with one of the radial passages 154 which is in communication through a ball check 155 with one of the injector lines 156 that services one of the cylinders in one of the engine groups of six cylinders.

The radial passages 151 and 154 alternate around the casing 135, with each radial passage 147 disposed between a radial passage 151 and a radial passage 154. Accordingly, fuel discharged by the piston 138 flows successively to individual cylinders in the respective engine groups. Except for the difference in delivery distribution of the fuel charges, the apparatus otherwise operates in the same manner as already discussed in connection with the device shown in Fig. 16, including the adjustment of the valve 141 to regulate the amount of the individual fuel charges, as already described, and the seating pressure of the ball checks 152 and 155 being greater than the fuel pressure in the supply pipe 156.

All of the foregoing types are characterized by a relatively simple distributor construction and one that is particularly suitable for use with engines comprising six or more cylinders. In the high speed type of oil burning engines, one of the principal problems resides in providing for an adequate inter-port seal in the distributor and oil metering construction with the object of minimizing leakage. Due to the substantially uni-directional flow of the fuel between the charging pump and the injector lines and also because of the fact that the inlet and discharge ports for the pump chamber are spaced to provide adequate inter-port seals, any variation in this sealing space may, in the modification shown in Figs. 16 and 20, be effected simply by varying the length of the rotary cylinder. The sensitivity of control of the amount of the fuel charges is also an important feature of my invention, since it provides for an accurate and controllable measuring of the relatively minute charges of the liquid fuel which is a primary requisite for efficient Diesel engine operation. These charges are drop-like in size as a maximum and they range downwardly to a fraction of a drop equivalent approximately to the size of a pin head.

I claim:

1. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism comprising a stationary member and a moving member including a bore constituting the pump chamber and within which the piston is operable, the stationary and moving members having ports registrable to charge the chamber with fuel by the charging means and the moving member having a separate port through which the piston discharges the fuel to the respective engine cylinders, the piston and moving member being mechanically driven in timed relation to the engine.

2. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism comprising a stationary member and a constantly rotating member including a bore constituting the pump chamber and within which the piston is operable, the stationary and rotating members having ports registrable to charge the chamber with fuel by the charging means and the rotating member having a separate port through which the piston discharges the fuel to the respective engine cylinders, the piston and rotary member being mechanically driven in timed relation to the engine.

3. In a fuel feeding and distributing apparatus for a multi-cylinder, oil burning engine, the combination of a fuel pump comprising a rotary cylinder and a piston, means for charging the cylinder with fuel under pressure, and a stationary member having a port successively registrable with ports on the cylinder and through which the cylinder is successively charged with fuel by the charging means, the cylinder having a separate port through which the piston discharges the fuel to the respective engine cylinders, the piston and cylinder being mechanically driven in timed relation to the engine.

4. In a fuel feeding and distributing apparatus for a multi-cylinder, oil burning engine, the combination of a cylindrical casing having a plurality of ports each of which communicates with an engine cylinder, a fuel pump comprising a cylinder rotatable in the casing and a piston reciprocable in the pump cylinder, the pump cylinder having a plurality of inlet ports spaced around one end face and a discharge port located in its lateral surface, all of the ports communicating with the chamber of the pump, a stationary member having a flat face contacting said end face and provided with a port communicating with a fuel source and adapted to register successively with the inlet ports to charge the pump cylinder with fuel, the discharge port registering successively with the casing ports and through which the piston delivers the fuel to the respective engine cylinders, and means for operating the cylinder and piston in timed relation to the engine.

5. In a fuel pump and distributing apparatus for a multi-cylinder, oil burning engine, the combination of a fuel pump comprising a rotary cylinder and a piston reciprocable therein, a stationary member having a port communicating with a fuel source and successively registrable with ports on the cylinder and through which the cylinder is successively charged with fuel, the cylinder having a separate port through which the piston discharges the fuel to the respective engine cylinders, a shaft rotating in timed relation to the engine crankshaft and drivably connected to the rotary cylinder, a plurality of radial cam members slidably mounted on the shaft for reciprocating the piston, and means for varying the positions of the members to vary the stroke of the pump piston.

6. In a fuel pump and distributing apparatus for a multi-cylinder, oil burning engine, the combination of a casing having a plurality of ports disposed around the inner wall thereof, each of which communicates with an engine cylinder, a fuel pump comprising a cylinder rotatable in the casing and a piston reciprocable in the cylinder, the pump cylinder having a plurality of inlet ports spaced around one end face and a discharge port located in its lateral surface, all of the ports communicating with the chamber of the pump, a stationary member having a flat face contacting said end face and provided with a port communicating with a fuel source and adapted to register successively with the inlet ports to charge the pump cylinder with fuel, the discharge port registering successively with the casing ports and through which the piston delivers the fuel to the respective engine cylinders, a shaft rotating in timed relation to the engine crankshaft and drivably connected to the pump cylinder for rotating the same, and means carried by the shaft for reciprocating the piston.

7. In a fuel pump and distributing apparatus for a multi-cylinder, oil burning engine, the combination of a casing having a plurality of ports disposed around the inner wall thereof, each of which communicates with an engine cylinder, a fuel pump comprising a cylinder rotatable in the casing and a piston reciprocable in the cylinder, the pump cylinder having a plurality of inlet ports spaced around one end face and a discharge port located in its lateral surface, all of the ports communicating with the chamber of the pump, a stationary member having a flat face contacting said end face and provided with a port communicating with a fuel source and adapted to register successively with the inlet ports to charge the pump cylinder with fuel, the discharge port registering successively with the casing ports and through which the piston delivers the fuel to the respective engine cylinders, a shaft rotating in timed relation to the engine crankshaft and drivably connected to the pump cylinder for rotating the same, a plurality of radial cam members slidably mounted on the shaft for reciprocating the piston, and means for varying the stroke of the piston by varying the positions of the cam members.

8. In a fuel feeding and distributing apparatus for a multi-cylinder, oil burning engine, in which the cylinders are divided in groups for fuel distribution, the combination of a fuel pump of the plunger type having a single piston for feeding fuel to the cylinders, means for charging the pump with fuel under pressure, and distributing mechanism comprising a stationary member and a moving member including a bore constituting the pump chamber and within which the piston is operable, the stationary and moving members having ports registrable to charge the chamber with fuel by the charging means and the chamber having a plurality of discharge ports spaced lengthwise thereof and through which the fuel charges are alternately delivered to the respective engine cylinders, one discharge port being operatively associated with each group of engine cylinders, the piston and moving member being mechanically driven in timed relation to the engine.

9. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism comprising a stationary member and a moving member including a bore constituting the pump chamber and within which the piston is operable, the stationary member having a feeding port, and the moving member having a face provided with inlet ports successively registrable with the feeding port to charge the chamber with fuel by the charging means and the moving member having a separate face provided with a discharge port through which the piston discharges the fuel to the respective engine cylinders, and the piston and moving member being mechanically driven in timed relation to the engine.

10. In a fuel feeding and distributing apparatus for a multi-cylinder, oil burning engine in which the cylinders are divided in groups for fuel distribution, the combination of a fuel pump comprising a rotary cylinder and a piston, means for charging the rotary cylinder with fuel, the cylinder having a plurality of discharge ports spaced lengthwise thereof and through which the fuel charges are alternately delivered to the respective engine cylinders by the pump piston, one port being operatively associated with each group of engine cylinders, and the piston and rotary cylinder being mechanically driven in timed relation to the engine.

11. In a fuel feeding and distributing apparatus for a multi-cylinder, oil burning engine, the combination of a fuel pump of the plunger type having a single, constant stroke piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the moving member having a separate port through which the piston discharges the fuel to the respective engine cylinders, the piston and moving member being mechanically driven in timed relation to the engine, and a valve having a bleeding port communicating with the pump chamber and determining by its position relative to the piston at the commencement of its delivery stroke the amount of fuel diverted through the bleeding port and the amount fed to the engine cylinders during the delivery stroke of the piston.

12. In a fuel feeding and distributing apparatus for a multi-cylinder, oil burning engine, the combination of a fuel pump of the plunger type having a single constant stroke piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the moving member having a separate port through which the piston discharges the fuel to the respective engine cylinders, the piston and moving member being mechanically driven in timed relation to the engine, and a valve having a bleeding port communicating with the pump chamber and adapted to be closed by the piston during its stroke, the extent of movement of the piston after closure determining the amount of fuel fed to the engine cylinders.

13. In a fuel feeding and distributing apparatus for a multi-cylinder, oil burning engine, the combination of a fuel pump of the plunger type having a single, constant stroke piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the moving member having a separate port through which the piston discharges the fuel to the respective engine cylinders, the piston and moving member being mechanically driven in timed relation to the engine, and a valve having a bleeding port adapted to communicate with the pump chamber and adjustable between limiting positions in which the bleeding port is closed and not closed, respectively, by the piston throughout the delivery stroke thereof corresponding, respectively, to fully opened and closed positions of the engine throttle.

14. In a fuel feeding and distributing apparatus for a multi-cylinder, oil burning engine, the combination of a fuel pump of the plunger type having a single, constant stroke piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the moving member having a separate port through which the piston discharges the fuel to the respective engine cylinders, the piston and moving member being mechanically driven in timed relation to the engine, and a valve having a bleeding port connecting the pump chamber and the charging means and determining by its position the amount of fuel diverted through the bleeding port against the pressure of the charging means and the amount fed to the engine cylinders during the delivery stroke of the piston.

15. In a fuel feeding and distributing apparatus for a multi-cylinder, oil burning engine, the combination of a fuel pump of the plunger type having a single, constant stroke piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the moving member having a separate port through which the piston discharges the fuel to the respective engine cylinders, the piston and moving member being mechanically driven in timed relation to the engine, and a valve having a bleeding port connecting the pump chamber and the charging means and adapted to be closed by the piston during its stroke, the movement of the piston prior to closure of the bleeding port diverting a portion of the fuel in the pump chamber through the bleeding port against the pressure of the charging means and the movement of the piston after closure determining the amount of fuel fed to the engine cylinders.

16. In a fuel feeding and distributing apparatus for a multi-cylinder, oil burning engine, the combination of a fuel pump of the plunger type having a single, constant stroke piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the moving member having a separate port through which the piston discharges the fuel to the respective engine cylinders, the piston and moving member being mechanically driven in timed relation to the engine, and a valve having a bleeding port connecting the pump chamber and the charging means and adjustable between limiting positions in which the bleeding port is closed and not closed, respectively, by the piston throughout the delivery stroke thereof corresponding, respectively, to fully opened and closed positions of the engine throttle.

17. In a fuel feeding and distributing apparatus for a multi-cylinder, oil burning engine, the combination of a fuel pump of the plunger type having a single, constant stroke, sleeve piston for feeding fuel to the engine cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the moving member having a separate port through which the piston discharges the fuel to the respective engine cylinders, the piston and moving member being mechanically driven in timed relation to the engine, and a hollow valve fitting within the piston and forming a wall of the pump chamber, the interior of the valve being in constant communication with the charging means and adapted for communication with the pump chamber through a bleeding port provided in the wall of the valve, the position of the bleeding port relative to the piston determining the amount of fuel diverted through the bleeding port against the pressure of the charging means and the amount fed to the engine cylinders during the charging stroke of the piston.

18. In a fuel feeding and distributing apparatus for a multi-cylinder, oil burning engine, the combination of a fuel pump of the plunger type having a single, constant stroke, sleeve piston for feeding fuel to the engine cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the moving member having a separate port through which the piston discharges the fuel to the respective engine cylinders, the piston and moving member being mechanically driven in timed relation to the engine, and a hollow valve fitting within the piston and forming a wall of the pump chamber, the interior of the valve being in constant communication with the charging means and communicating with the pump chamber through a bleeding port provided in the wall of the valve, the valve being adjustable between limiting positions in which the bleeding port is closed and not closed, respectively, by the piston throughoutt he delivery stroke thereof corresponding, respectively, to fully opened and fully closed positions of the engine throttle.

19. In a fuel feeding and distributing apparatus for a multi-cylinder, oil burning engine, the combination of a fuel pump comprising a rotary cylinder and a constant stroke piston, a stationary member having a plurality of ports registrable in succession with a port on the rotary cylinder and through which the rotary cylinder is successively charged with fuel under pressure, the rotary cylinder having a separate port through which the piston discharges the fuel to the respective engine cylinders, the piston and rotary cylinder being mechanically driven in timed relation to the engine, and a valve having a bleeding port communicating with the rotary cylinder and determining by its position relative to the piston at the commencement of its delivery stroke the amount of fuel diverted through the bleeding port and the amount fed to the engine cylinders during the delivery stroke of the piston.

20. In a fuel feeding and distributing apparatus for a multi-cylinder, oil burning engine, the combination of a fuel pump comprising a rotary cylinder and a constant stroke piston, a stationary member having a plurality of ports registrable in succession with a port on the rotary cylinder and through which the rotary cylinder is successively charged with fuel under pressure, the rotary cylinder having a separate port through which the piston discharges the fuel to the respective engine cylinders, the piston and rotary cylinder being mechanically driven in timed relation to the engine, and a valve having a bleeding port communicating with the rotary cylinder and adapted to be closed by the piston during its stroke, the extent of movement of the piston after closure determining the amount of fuel fed to the engine cylinders.

21. In a fuel feeding and distributing apparatus for a multi-cylinder, oil burning engine, the combination of a fuel pump comprising a rotary cylinder and a constant stroke piston, a stationary member having a plurality of ports registrable in succession with a port on the rotary cylinder and through which the rotary cylinder is successively charged with fuel under pressure, the rotary cylinder having a separate port through which the piston discharges the fuel to the respective engine cylinders, the piston and rotary cylinder being mechanically driven in timed relation to the engine, and a valve having a bleeding port adapted to communicate with the rotary cylinder and adjustable between limiting positions in which the bleeding port is closed and not closed, respectively, by the piston throughout the delivery stroke thereof corresponding, respectively, to fully opened and fully closed positions of the engine throttle.

22. In a feeding and distributing apparatus for a multi-cylinder, oil burning engine, the combination of a fuel pump comprising a rotary cylinder and a constant stroke piston, a stationary member constituting a casing for the rotary cylinder and having a plurality of ports registrable in succession with a port on the rotary cylinder and through which the rotary cylinder is successively charged with fuel under pressure, the rotary cylinder having a separate port through which the piston discharges the fuel to the respective engine cylinders, the piston and rotary cylinder being mechanically driven in timed relation to the engine, and a valve having a bleeding port communicating with the rotary cylinder and determining by its position relative to the piston at the commencement of its delivery stroke the amount of fuel diverted through the bleeding port and the amount fed to the engine cylinders during the delivery stroke of the piston.

23. In a fuel feeding apparatus for an oil burning engine, the combination of a fuel pump having a constant stroke, sleeve piston, means for charging the pump chamber with fuel under pressure, and means for regulating the amount of fuel delivered by the piston comprising a hollow valve fitting within the piston and forming a wall of the pump chamber, the interior of the valve being in constant communication with the charging means and adapted for communication with the pump chamber through a bleeding port provided in the wall of the valve, the position of the bleeding port relative to the piston determining the amount of fuel diverted through the bleeding port against the pressure of the charging means and the amount fed to the engine cylinders during the delivery stroke of the piston.

24. In a fuel feeding and distributing apparatus for a multi-cylinder, oil burning engine in which the cylinders are divided in groups for fuel distribution, the combination of a fuel pump of the plunger type having a single piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the chamber having a plurality of discharge ports spaced lengthwise thereof and through which the fuel charges are in turn delivered to the respective engine cylinders, one discharge port being operatively associated with each group of engine cylinders, the piston and moving member being mechanically driven in timed relation to the engine, and a valve having a bleeding port communicating with the pump chamber and determining by its position relative to the piston at the commencement of its delivery stroke the amount of fuel diverted through the bleeding port and the amount fed to the engine cylinders during the delivery stroke of the piston.

25. In a fuel feeding and distributing apparatus for a multi-cylinder, oil burning engine in which the cylinders are divided in groups for fuel distribution, the combination of a fuel pump of the plunger type having a single piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the chamber having a plurality of discharge ports spaced lengthwise thereof and through which the fuel charges are in turn delivered to the respective engine cylinders, one discharge port being operatively associated with each group of engine cylinders, the piston and moving member being mechanically driven in timed relation to the engine, and a valve having a bleeding port communicating with the pump chamber and adapted to be closed by the piston during its stroke, the extent of movement of the piston after closure determining the amount of fuel fed to the engine cylinders.

26. In a fuel feeding and distributing apparatus for a multi-cylinder, oil burning engine in which the cylinders are divided in groups for fuel distribution, the combination of a fuel pump of the plunger type having a single piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the chamber having a plurality of discharge ports spaced lengthwise thereof and through which the fuel charges are in turn delivered to the respective engine cylinders, one discharge port being operatively associated with each group of engine cylinders, the piston and moving member being mechanically driven in timed relation to the engine, and a valve having a bleeding port adapted to communicate with the pump chamber and adjustable between limiting positions in which the bleeding port is closed and not closed, respectively, by the piston throughout the delivery stroke thereof corresponding, respectively, to fully opened and fully closed positions of the engine throttle.

27. In a fuel feeding and distributing apparatus for a multi-cylinder, oil burning engine in which the cylinders are divided in groups for fuel distribution, the combination of a fuel pump of the plunger type having a single piston for feeding fuel to the cylinders, means for charging the pump with fuel under pressure, distributing mechanism comprising a stationary member and a moving member including a bore constituting the pump chamber and within which the piston is operable, the stationary and moving members having ports registrable to charge the chamber with fuel by the charging means and the chamber having a plurality of discharge ports spaced lengthwise thereof and through which the fuel charges are in turn delivered to the respective engine cylinders, one discharge port being operatively associated with each group of engine cylinders, the piston and moving member being mechanically driven in timed relation to the engine, and a valve having a bleeding port connecting the pump chamber and the charging means and determining by its position relative to the piston at the commencement of its delivery stroke the amount of fuel diverted through the bleeding port against the pressure of the charging means and the amount fed to the engine cylinders during the deivery stroke of the piston.

28. In a fuel feeding and distributing apparatus for a multi-cylinder, oil burning engine in which the cylinders are divided in groups for fuel distribution, the combination of a fuel pump of the plunger type having a single, constant stroke, sleeve piston for feeding fuel to the cylinders, means for charging the pump with fuel under pressure, and distributing mechanism comprising a stationary member and a moving member including a bore constituting the pump chamber and within which the piston is operable, the stationary and moving members having ports registrable to charge the chamber with fuel by the charging means and the chamber having a plurality of discharge ports spaced lengthwise thereof and through which the fuel charges are in turn delivered to the respective engine cylinders, one discharge port being operatively associated with each group of engine cylinders, the piston and moving member being mechanically driven in timed relation to the engine, and a hollow valve fitting within the piston and forming a wall of the pump chamber, the interior of the valve being in constant communication with the charging means and adapted for communication with the pump chamber through a bleeding port provided in the wall of the valve, the position of the bleeding port relative to the piston determining the amount of fuel diverted through the bleeding port against the pressure of the charging means and the amount fed to the engine cylinders during the delivery stroke of the piston.

29. In a fuel feeding and distributing apparatus, for a multi-cylinder, oil burning engine in which the cylinders are divided in groups for fuel distribution, the combination of a fuel pump comprising a rotary cylinder and a piston and adapted to be charged with fuel, the cylinder having a plurality of discharge ports spaced lengthwise thereof and through which the fuel charges are alternately delivered to the respective engine cylinders by the pump piston, one port being operatively associated with each group of engine cylinders and the piston and rotary cylinder being mechanically driven in timed relation to the engine, and a valve having a bleeding port communicating with the rotary cylinder and determining by its position relative to the piston at the commencement of its delivery stroke the amount of fuel diverted to the bleeding port and the amount fed to the engine cylinders during the delivery stroke of the piston.

30. In a fuel feeding and distributing apparatus for a multi-cylinder, oil burning engine in which the cylinders are divided in groups for fuel distribution, the combination of a fuel pump comprising a rotary cylinder and a piston and adapted to be charged with fuel, the cylinder having a plurality of discharge ports spaced lengthwise thereof and through which the fuel charges are in turn delivered to the respective engine cylinders by the pump piston, one port being operatively associated with each group of engine cylinders and the piston and rotary cylinder being mechanically driven in timed relation to the engine, and a valve having a bleeding port communicating with the rotary cylinder and adapted to be closed by the piston during its stroke, the extent of movement of the piston after closure determining the amount of fuel fed to the engine cylinders.

31. In a fuel feeding and distributing apparatus for a multi-cylinder, oil burning engine in which the cylinders are divided in groups for fuel distribution, the combination of a fuel pump comprising a rotary cylinder and a piston and adapted to be charged with fuel, the cylinder having a plurality of discharge ports spaced lengthwise thereof and through which the fuel charges are in turn delivered to the respective engine cylinders by the pump piston, one port being operatively associated with each group of engine cylinders and the piston and rotary cylinder being mechanically driven in timed relation to the engine, and a valve having a bleeding port adapted to communicate with the pump chamber and adjustable between limiting positions in which the bleeding port is closed and not closed, respectively, by the piston throughout the delivery stroke thereof corresponding, respectively, to fully opened and fully closed positions of the engine throttle.

32. In a fuel feeding and distributing apparatus for a multi-cylinder, oil burning engine in which the cylinders are divided in groups for fuel distribution, the combination of a fuel pump comprising a rotary cylinder and a piston, means for charging the rotary cylinder with fuel, the cylinder having a plurality of discharge ports spaced lengthwise thereof and through which the fuel charges are in turn delivered to the respective engine cylinders by the pump piston, one port being operatively associated with each group of engine cylinders and the piston and rotary cylinder being mechanically driven in timed relation to the engine, and a valve having a bleeding port connecting the rotary cylinder and charging means and determining by its position relative to the piston at the commencement of its delivery stroke the amount of fuel diverted through the bleeding port against the pressure of the charging means and the amount fed to the engine cylinders during the delivery stroke of the piston.

33. In a fuel feeding and distributing apparatus for a multi-cylinder, oil burning engine in which the cylinders are divided in groups for fuel distribution, the combination of a fuel pump comprising a rotary cylinder and a constant stroke, sleeve piston, means for charging the rotary cylinder with fuel, the cylinder having a plurality of discharge ports spaced lengthwise thereof and through which the fuel charges are in turn delivered to the respective engine cylinders by the pump piston, one port being operatively associated with each group of engine cylinders and the piston and rotary cylinder being mechanically driven in timed relation to the engine, and a hollow valve fitting within the piston and forming a wall of the pump chamber, the interior of the valve being in constant communication with the charging means and adapted for communication with the pump chamber through a bleeding port provided in the wall of the valve, the position of the bleeding port relative to the piston determining the amount of fuel diverted through the bleeding port against the pressure of the charging means and the amount fed to the engine cylinders during the delivery stroke of the piston.

34. In a fuel feeding and distributing apparatus for a multi-cylinder, oil burning engine, the combination of a fuel pump comprising a rotary cylinder and a piston and adapted to be charged with fuel under pressure, a stationary member having a plurality of ports registrable in succession with a port on the cylinder and through which the cylinder is successively charged with fuel, the cylinder having a separate port through which the piston discharges the fuel to the respective engine cylinders and the piston and cylinder being mechanically driven in timed relation to the engine, and a passage in the stationary member adapted to be constantly filled with fuel under pressure and terminating at the journal face of the member to provide constant lubrication for the cylinder.

35. In a fuel feeding and distributing apparatus for a multi-cylinder, oil burning engine, the combination of a fuel pump having a constant stroke piston and adapted to be charged with fuel under pressure, a distributing mechanism comprising a pair of relatively movable parts, one of the parts including the pump chamber and both of the parts having ports respectively registrable to charge the chamber with fuel and to discharge fuel to the engine cylinders, and means for regulating the amount of fuel delivered by the piston comprising a valve having a bleeding port communicating with the pump chamber, the valve determining by its position the amount of fuel diverted through the bleeding port and the amount fed to the engine cylinders during the delivery stroke of the piston.

36. In a fuel feeding and distributing apparatus for a multi-cylinder, oil burning engine, the combination of a fuel pump having a constant stroke piston and adapted to be charged with fuel under pressure, a distributing mechanism comprising a pair of relatively movable parts, one of the parts including the pump chamber and both of the parts having ports respectively registrable to charge the chamber with fuel and to discharge fuel to the engine cylinders, and means for regulating the amount of fuel delivered by the piston comprising a valve having a bleeding port communicating with the pump chamber and adapted to be closed by the piston during its stroke, the extent of movement of the piston after closure determining the amount of fuel fed to the engine cylinders.

37. In a fuel feeding and distributing apparatus for a multi-cylinder, oil burning engine, the combination of a fuel pump having a constant stroke piston and adapted to be charged with fuel under pressure, a distributing mechanism comprising a pair of relatively movable parts, one of the parts including the pump chamber and both of the parts having ports respectively registrable to charge the chamber with fuel and to discharge fuel to the engine cylinders, and means for regulating the amount of fuel delivered by the piston comprising a valve having a bleeding port adapted to communicate with the pump chamber and adjustable between limiting positions in which the bleeding port is closed and not closed, respectively, by the piston throughout the delivery stroke thereof corresponding, respectively, to fully opened and fully closed positions of the engine throttle.

38. In a fuel feeding and distributing apparatus for a multi-cylinder, oil burning engine, the combination of a fuel pump having a constant stroke piston, means for charging the pump chamber with fuel under pressure, distributing mechanism comprising a pair of relatively movable parts, one of the parts including a pump chamber and both of the parts having ports respectively registrable to charge the chamber with fuel and to discharge fuel to the engine cylinders, and means for regulating the amount of fuel delivered by the piston comprising a valve having a bleeding port connecting the pump chamber and the charging means, the valve determining by its position the amount of fuel diverted through the bleeding port against the pressure of the charging means and the amount fed to the engine cylinders during the delivery stroke of the piston.

39. In a fuel feeding apparatus for an oil burning engine, the combination of a fuel pump having a constant stroke sleeve piston, means for charging the pump chamber with fuel under pressure, and means for regulating the amount of fuel delivered by the piston comprising a hollow valve fitting within the piston and forming a wall of the pump chamber, the interior of the valve being adapted for communication with the pump chamber through a bleeding port provided in the wall of the valve, the position of the bleeding port relative to the piston determining the amount of the fuel diverted through the bleeding port to the interior of the valve and the amount fed to the engine cylinders during the delivery stroke of the piston.

CLESSIE L. CUMMINS.